US012686733B2

(12) United States Patent
Nakahata et al.

(10) Patent No.: US 12,686,733 B2
(45) Date of Patent: Jul. 21, 2026

(54) PLASTICIZER, COMPOSITION, AND TIRE

(71) Applicant: Sumitomo Rubber Industries, Ltd., Hyogo (JP)

(72) Inventors: Shoko Nakahata, Kobe (JP); Kensuke Washizu, Kobe (JP); Shuichiro Ono, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 816 days.

(21) Appl. No.: 17/594,956

(22) PCT Filed: Apr. 27, 2020

(86) PCT No.: PCT/JP2020/017932
§ 371 (c)(1),
(2) Date: Nov. 4, 2021

(87) PCT Pub. No.: WO2020/230606
PCT Pub. Date: Nov. 19, 2020

(65) Prior Publication Data

US 2022/0306777 A1 Sep. 29, 2022

(30) Foreign Application Priority Data

May 10, 2019 (JP) ................................ 2019-090112

(51) Int. Cl.
*C08F 120/54* (2006.01)
*B60C 1/00* (2006.01)
*C08L 7/00* (2006.01)

(52) U.S. Cl.
CPC .......... *C08F 120/54* (2013.01); *B60C 1/0016* (2013.01); *C08L 7/00* (2013.01)

(58) Field of Classification Search
CPC .... C08F 120/54; C08F 279/02; C08F 279/04; C08F 279/06; B60C 1/0016; B60C 1/00; C08L 7/00
See application file for complete search history.

(56) References Cited

U.S. PATENT DOCUMENTS

| | | | |
|---|---|---|---|
| 6,202,726 | B1 | 3/2001 | Corvasce et al. |
| 6,539,996 | B1 | 4/2003 | Corvasce et al. |
| 8,415,432 | B1 | 4/2013 | Mruk et al. |
| 9,890,272 | B2 | 2/2018 | Tokimune et al. |
| 2013/0165579 | A1 | 6/2013 | Mruk et al. |
| 2013/0165589 | A1 | 6/2013 | Mruk et al. |
| 2014/0148554 | A1 | 5/2014 | Ma et al. |

FOREIGN PATENT DOCUMENTS

| | | | | |
|---|---|---|---|---|
| CN | 103409837 | A | | 11/2013 |
| CN | 107686278 | A | | 2/2018 |
| EP | 2 607 102 | A1 | | 6/2013 |
| JP | H05-506941 | A | | 10/1993 |
| JP | H10-504841 | A | | 5/1998 |
| JP | 2000-289415 | A | | 10/2000 |
| JP | 2001-123018 | A | | 5/2001 |
| JP | 2004-010850 | A | | 1/2004 |
| JP | 2005-154586 | A | | 6/2005 |
| JP | 2008-214377 | A | | 9/2008 |
| JP | 2013-136748 | A | | 7/2013 |
| JP | 2013-136749 | A | | 7/2013 |
| JP | 2013-139563 | A | | 7/2013 |
| JP | 2015-120093 | A | | 7/2015 |
| JP | 2017-537185 | A | | 12/2017 |
| JP | 2018030973 | A | * | 3/2018 |
| KR | 10-1867231 | B1 | | 6/2018 |
| WO | 91/14974 | A1 | | 10/1991 |
| WO | 96/39030 | A1 | | 12/1996 |
| WO | 2016/069673 | A1 | | 5/2016 |

OTHER PUBLICATIONS

Ge KR101867231B1 (machine translation from KIPO) (Year: 2018).*
Uchiyama JP2018030973A (JPO translation) (Year: 2018).*
International Search Report issued in PCT/JP2020/017932; mailed Jul. 14, 2020.
Kageyama A., "Polymerization and use of polymers and polymers", Vinylether, Macromolecules, vol. 5, No. 9, 1956, pp. 414-417; re-submitted with the attached English translation of the Japanese Office Action mailed May 9, 2023, which corresponds to Japanese Patent Application No. 2020-570076, as an additional concise explanation of relevance.
Conzatti et al., "Surface functionalization of plasticized chitosan films through PNIPAM grafting via UV and plasma graft polymerization", European Polymer Journal, 2018, pp. 1-26.
Andersson et al., "Composition and Film Properties of Temperature Responsive, Hydrophobically Modified Potato Starch", Starch-Starke 60, 2008, pp. 539-550.
Kageyama A., "Polymerization and use of polymers and polymers", Vinylether, Macromolecules, vol. 5, No. 9, 1956, pp. 414-417, https://doi.org/10.1295/kobunshi.5.9_414. The English translation of the Japanese Office Action mailed Sep. 6, 2022, which corresponds to Japanese Patent Application No. 2021-165309, as a concise explanation of relevance is submitted herewith.

* cited by examiner

*Primary Examiner* — Robert C Boyle
(74) *Attorney, Agent, or Firm* — Studebaker Brackett PLLC

(57) ABSTRACT

The present invention provides plasticizers, compositions, and tires which can vary tire performance in response to temperature changes. The present invention relates to a plasticizer for resins and/or elastomers, containing a group that changes hydrophilicity with changes in temperature.

6 Claims, No Drawings

PLASTICIZER, COMPOSITION, AND TIRE

TECHNICAL FIELD

The present invention relates to plasticizers, compositions, and tires.

BACKGROUND ART

Tires with various desirable properties have been desired (see, for example, Patent Literature 1).

CITATION LIST

Patent Literature

Patent Literature 1: JP 2008-214377 A

SUMMARY OF INVENTION

Technical Problem

To date, however, the tire industry has not focused on varying tire performance in response to temperature changes, and conventional techniques have room for improvement in varying tire performance in response to temperature changes.

The present invention aims to solve the above problem and provide plasticizers, compositions, and tires which can vary tire performance in response to temperature changes.

Solution to Problem

The present invention relates to a plasticizer for at least one of resins or elastomers, containing a group that changes hydrophilicity with changes in temperature.

The plasticizer is preferably an oil, an ester plasticizer, or a liquid or solid resin.

The group preferably shows a lower critical solution temperature in water.

The group is preferably represented by the following formula (I):

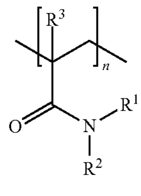

(I)

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

The group is preferably poly(N-isopropylacrylamide).

The present invention also relates to a composition, containing the specified plasticizer.

The composition preferably contains a rubber.

The composition is preferably for use in tire treads.

The present invention also relates to a tire, including a tire component containing the specified composition.

The tire component is preferably a tread.

Advantageous Effects of Invention

The present invention provides plasticizers for resins and/or elastomers, containing a group that changes hydrophilicity with changes in temperature. Such plasticizers can vary tire performance in response to temperature changes.

DESCRIPTION OF EMBODIMENTS (Plasticizer)

The plasticizers of the present invention include plasticizers for resins and/or elastomers, containing a group that changes hydrophilicity with changes in temperature. Such plasticizers can vary tire performance in response to temperature changes.

The reason for this advantageous effect is not exactly clear but may be explained as follows.

The plasticizers of the present invention contain a group that changes hydrophilicity with changes in temperature. Thus, it is believed that the changes in hydrophilicity with changes in temperature may change the compatibility with other components in the compositions, so that the tire performance can be varied in response to temperature changes.

The plasticizers as used herein refer to materials that impart plasticity to resins and/or elastomers, and conceptually include liquid plasticizers (plasticizers that are liquid at 25° C.) and solid plasticizers (plasticizers that are solid at 25° C.). Specifically, they are components that can be extracted with acetone from the compositions. These plasticizers may be used alone or in combinations of two or more.

The group that changes hydrophilicity with changes in temperature as used herein may be any group that changes hydrophilicity with changes in temperature, preferably a group that reversibly changes hydrophilicity with changes in temperature.

Examples of the group that reversibly changes hydrophilicity with changes in temperature include temperature-responsive polymers (temperature-responsive polymer groups). Specifically, the plasticizers containing a group that changes hydrophilicity with changes in temperature may mean plasticizers containing a group formed of a temperature-responsive polymer, for example. Examples of such plasticizers include plasticizers grafted with temperature-responsive polymers, plasticizers containing temperature-responsive polymer units in the backbone, and plasticizers containing temperature-responsive polymer blocks in the backbone. These plasticizers may be used alone or in combinations of two or more.

Temperature-responsive polymers refer to materials which in water undergo reversible changes in the conformation of the polymer chains associated with hydration and dehydration in response to changes in temperature, and thus reversibly change hydrophilicity and hydrophobicity with changes in temperature. Such reversible changes are known to be caused by a molecular structure containing in a molecule a hydrophilic group capable of forming a hydrogen bond and a hydrophobic group hardly compatible with water.

In this context, the present inventors have found that temperature-responsive polymers exhibit reversible changes in hydrophilicity and hydrophobicity with changes in temperature not only in water but also in compositions containing resins and/or elastomers.

Known temperature-responsive polymers include polymers that show a lower critical solution temperature (LOST)

in water and polymers that show an upper critical solution temperature (UCST) in water. These polymers may be used alone or in combinations of two or more.

The polymers that show a LOST become hydrophobic at temperatures higher than the LOST as the intramolecular or intermolecular hydrophobic interaction becomes stronger to cause aggregation of the polymer chains. On the other hand, at temperatures lower than the LOST, they become hydrophilic as the polymer chains are hydrated by binding with water molecules. Thus, the polymers show a reversible phase transition behavior across the LOST.

In contrast, the polymers that show an UCST become hydrophobic and insoluble at temperatures lower than the UCST, while they become hydrophilic and soluble at temperatures higher than the UCST. Thus, the polymers show a reversible phase transition behavior across the UCST. The reason for such an UCST-type behavior is thought to be that intermolecular force can be driven by the hydrogen bonds between the side chains having a plurality of amide groups.

When the group that reversibly changes hydrophilicity with changes in temperature is a polymer that shows a LOST, the polymer may become incompatible with other components in the composition in response to temperature changes, so that the glass transition temperature can be changed. Thus, the tire performance (e.g., wet grip performance, ice grip performance) can be varied in response to temperature changes.

In the specified plasticizers, the group that reversibly changes hydrophilicity with changes in temperature is preferably a polymer that shows a LOST. In other words, the group that changes hydrophilicity with changes in temperature is preferably a group that shows a lower critical solution temperature in water.

The group that shows a lower critical solution temperature (LOST) in water as used herein refers to a group which is present in a plasticizer and which shows a lower critical solution temperature in water when the group is cleaved from the plasticizer and the cleaved group (polymer) is introduced into water.

Similarly, the group that shows an upper critical solution temperature (UCST) in water as used herein refers to a group which is present in a plasticizer and which shows an upper critical solution temperature in water when the group is cleaved from the plasticizer and the cleaved group (polymer) is introduced into water.

The group (polymer) that shows a LOST is described below.

The group (polymer) that shows a LOST may include a single group (polymer) or a combination of two or more groups (polymers).

The group (polymer) that shows a LOST may be any group (polymer) that shows a LOST. Preferred are poly(N-substituted (meth)acrylamides). Preferred among the poly (N-substituted (meth)acrylamides) are groups represented by the following formula (I):

(I)

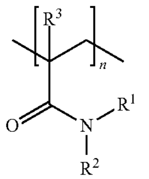

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

n is preferably 3 or larger, more preferably 5 or larger, still more preferably 10 or larger, particularly preferably 20 or larger, but is preferably 500 or smaller, more preferably 300 or smaller, still more preferably 150 or smaller, particularly preferably 80 or smaller, most preferably 40 or smaller, further most preferably 30 or smaller. When n is within the range indicated above, the advantageous effect tends to be better achieved.

The hydrocarbyl group for $R^1$ and $R^2$ may have any number of carbon atoms. The number of carbon atoms is preferably 1 or larger, more preferably 2 or larger, still more preferably 3 or larger, but is preferably 20 or smaller, more preferably 18 or smaller, still more preferably 14 or smaller, particularly preferably 10 or smaller, most preferably 6 or smaller, further most preferably 4 or smaller. When the number of carbon atoms is within the range indicated above, the advantageous effect tends to be better achieved.

Examples of the hydrocarbyl group for $R^1$ and $R^2$ include alkyl groups such as methyl, ethyl, n-propyl, isopropyl, n-butyl, sec-butyl, tert-butyl, n-pentyl, neopentyl, isopentyl, and n-hexyl groups; cycloalkyl groups such as a cyclohexyl group; and aryl groups such as methylphenyl and ethylphenyl groups. Preferred among these are alkyl and cycloalkyl groups, with alkyl groups being more preferred.

The number of carbon atoms in the ring structure formed by $R^1$ and $R^2$ is preferably 3 or larger, more preferably 4 or larger, but is preferably 7 or smaller, more preferably 5 or smaller. When the number of carbon atoms is within the range indicated above, the advantageous effect tends to be better achieved.

The hydrocarbyl group for $R^1$ and $R^2$ may be branched or unbranched, and is preferably a branched group.

Preferably, each of $R^1$ and $R^2$ is a hydrogen atom, an alkyl group (in particular, a branched alkyl group), or a cycloalkyl group, or $R^1$ and $R^2$ together form a ring structure. More preferably, $R^1$ and $R^2$ are any of the combinations shown in Table 1, still more preferably a combination of a hydrogen atom and an alkyl group (in particular, a branched alkyl group), particularly preferably a combination of a hydrogen atom and a propyl group (in particular, an isopropyl group).

TABLE 1

| Chemical structure of preferred poly(N-substituted acrylamides), LCST | |
|---|---|
| $—NR^1R^2$ | Activation temperature [LCST] (° C.) |
| $NH—CH_2—CH_3$ | 82 |
| $NH—CH_2—CH_2—CH_3$ | 22 |
| $NH—CH—(CH_3)_2$ | 32-34 |
| $N(CH_3)(CH_2—CH_3)$ | 56 |
| $N(CH_2—CH_3)_2$ | 32-42 |
| $N(CH_2—(CH_3)_2)(CH_3)$ | 25 |
| 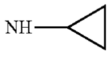 | 47 |
| 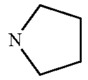 | 55 |

TABLE 1-continued

| Chemical structure of preferred poly(N-substituted acrylamides), LCST | |
|---|---|
| —$NR^1R^2$ | Activation temperature [LCST] (° C.) |
| 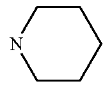 | 4 |

The hydrocarbyl group for $R^3$ may have any number of carbon atoms. The number of carbon atoms is preferably 1 or larger, but is preferably 5 or smaller, more preferably 3 or smaller, still more preferably 2 or smaller, particularly preferably 1. When the number of carbon atoms is within the range indicated above, the advantageous effect tends to be better achieved.

Examples of the hydrocarbyl group for $R^3$ include those listed for the hydrocarbyl group for $R^1$ and $R^2$. Preferred among them are alkyl groups.

The hydrocarbyl group for $R^3$ may be branched or unbranched.

$R^3$ is preferably a hydrogen atom or an alkyl group, more preferably a hydrogen atom.

Examples of the groups of formula (I) include: poly(N-alkylacrylamide) polymers such as poly(N-isopropylacrylamide), poly(N-ethylacrylamide), poly(N-n-propylacrylamide), poly(N-ethyl,N-methylacrylamide), poly(N,N-diethylacrylamide), poly(N-isopropyl,N-methylacrylamide), poly(N-cyclopropylacrylamide), poly(N-acryloylpyrrolidine), and poly(N-acryloylpiperidine); and poly(N-alkylmethacrylamide) polymers such as poly(N-isopropylmethacrylamide), poly(N-ethylmethyacrylamide), poly(N-n-propylmethacrylamide), poly(N-ethyl,N-methylmethacrylamide), poly(N,N-dimethylmethacrylamide), poly(N-isopropyl,N-methylmethacrylamide), poly(N-cyclopropylmethacrylamide), poly(N-methacryloylpyrrolidine), and poly(N-methacryloylpiperidine). These may be used alone or in combinations of two or more. Among these, poly(N-isopropylacrylamide) and poly(N,N-diethylacrylamide) are preferred, with poly(N-isopropylacrylamide) (PNIPAM) being more preferred.

PNIPAM is a thermosensitive material that exhibits large changes in surface energy in response to small changes in temperature. For example, see N. Mori, et al., Temperature Induced Changes in the Surface Wettability of SBR+PNIPA Films, 292, Macromol. Mater. Eng. 917, 917-22 (2007).

PNIPAM has in the side chains a hydrophobic isopropyl group at the base of which is a hydrophilic amide bond.

PNIPAM becomes soluble in water at temperatures lower than 32° C., where the hydrophilic amide bond moiety forms a hydrogen bond with a water molecule. On the other hand, at temperatures equal to or higher than 32° C., the hydrogen bond is cleaved due to the vigorous thermal motion of the molecules, and the intramolecular or intermolecular hydrophobic interaction due to the hydrophobic isopropyl group moieties in the side chains becomes stronger to cause aggregation of the polymer chains, so that PNIPAM becomes insoluble in water.

As above, PNIPAM has a LCST, which is a switching temperature at which it switches from a hydrophilic state to a hydrophobic state, of about 32° C.

The contact angle of a water droplet placed on a PNIPAM polymer film drastically changes above and below the LCST temperature. For example, the contact angle of a water droplet placed on a PINPAM film is about 60° (hydrophilic) at below 32° C. and then, when it is heated to a temperature higher than 32° C., exceeds about 93° (hydrophobic).

Plasticizers containing a PNIPAM group, which greatly changes surface properties from hydrophilic to hydrophobic at about 32° C., may be used as plasticizers for resins and/or elastomers to vary tire performance in response to temperature changes.

Examples of groups (polymers) that show a LCST other than the groups of formula (I) include poly(N-vinyl-caprolactam) represented by the formula (II) below (LCST: about 31° C.), poly(2-alkyl-2-oxazolines) represented by the formula (III) below (LCST: about 62° C. when R is an ethyl group, about 36° C. when R is an isopropyl group, and about 25° C. when R is an n-propyl group), alkyl-substituted celluloses (e.g., methyl cellulose represented by the formula (IV) below (LCST: about 50° C.), hydroxypropyl cellulose, hydroxyethyl methyl cellulose, and hydroxypropyl methyl cellulose), poly(N-ethoxyethylacrylamide) (LCST: about 35° C.), poly(N-ethoxyethylmethacrylamide) (LCST: about 45° C.), poly(N-tetrahydrofurfurylacrylamide) (LSCT: about 28° C.), poly(N-tetrahydrofurfurylmethacrylamide) (LSCT: about 35° C.), polyvinyl methyl ether, poly[2-(dimethylamino) ethyl methacrylate], poly(3-ethyl-N-vinyl-2-pyrrolidone), hydroxybutyl chitosan, polyoxyethylene (20) sorbitan monostearate, polyoxyethylene (20) sorbitan monolaurate, polyoxyethylene (20) sorbitan monooleate, poly(ethylene glycol)methacrylate containing 2 to 6 ethylene glycol units, polyethylene glycol-co-polypropylene glycol (preferably one containing 2 to 8 ethylene glycol units and 2 to 8 polypropylene units, more preferably a compound of formula (A)), ethoxylated iso-$C_{13}H_{27}$-alcohols (preferably having an ethoxylation degree of 4 to 8), polyethylene glycol containing 4 to 50, preferably 4 to 20 ethylene glycol units, polypropylene glycol containing 4 to 30, preferably 4 to 15 propylene glycol units, monomethyl, dimethyl, monoethyl, or diethyl ethers of polyethylene glycol containing 4 to 50, preferably 4 to 20 ethylene glycol units, and monomethyl, dimethyl, monoethyl, or diethyl ethers of polypropylene glycol containing 4 to 50, preferably 4 to 20 propylene glycol units. These may be used alone or in combinations of two or more.

(A) $HO—[—CH_2—CH_2—O]_x—[—CH(CH_3)—CH_2—O]_y—[—CH_2—CH_2—O]_z—H$

In the formula, y is 3 to 10, and each of X and Z is 1 to 8, provide that y+x+z=5 to 18.

(II)

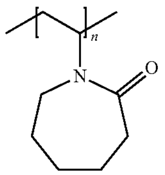

(III)

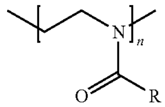

(IV)

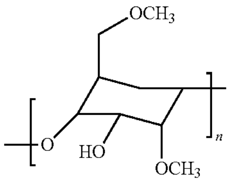

In formulas (II) to (IV), n is as defined for n in formula (I). In formula (III), R is an alkyl group selected from an n-propyl group, an isopropyl group, or an ethyl group.

The group that changes hydrophilicity with changes in temperature (the group formed of a temperature-responsive polymer) preferably has a weight average molecular weight of 330 or more, more preferably 560 or more, still more preferably 1130 or more, but preferably 57000 or less, more preferably 34000 or less, still more preferably 17000 or less. When the weight average molecular weight is within the range indicated above, the advantageous effect tends to be better achieved.

The temperature-responsive polymer preferably has a phase transition temperature (lower critical solution temperature (LCST) or upper critical solution temperature (UCST)) of 5° C. or higher, more preferably 15° C. or higher, still more preferably 20° C. or higher, particularly preferably 25° C. or higher, but preferably 60° C. or lower, more preferably 50° C. or lower, still more preferably 40° C. or lower, particularly preferably 35° C. or lower. When the phase transition temperature is within the range indicated above, the advantageous effect tends to be better achieved.

The phase transition temperature of the temperature-responsive polymer herein is measured using a temperature-controllable spectrophotometer. A temperature-responsive polymer aqueous solution adjusted at 10% by mass is charged into a cell. The cell is covered with a parafilm for preventing vaporization and an in-cell temperature sensor is attached thereto. Experiments are carried out at a measurement wavelength of 600 nm, an acquisition temperature of 0.1° C., and a rate of temperature rise of 0.1° C. The temperature at which the transmittance reaches 90% is defined as the phase transition temperature.

Here, the temperature-responsive polymer refers to a temperature-responsive polymer group (temperature-responsive polymer) cleaved from a plasticizer containing the temperature-responsive polymer group.

The amount of the group that changes hydrophilicity with changes in temperature (the group formed of a temperature-responsive polymer) based on 100% by mass of the plasticizer is preferably 0.1% by mass or more, more preferably 1% by mass or more, still more preferably 5% by mass or more, particularly preferably 10% by mass or more, most preferably 20% by mass or more, further most preferably 30% by mass or more, still further most preferably 40% by mass or more, but is preferably 99% by mass or less, more preferably 80% by mass or less, still more preferably 70% by mass or less, particularly preferably 60% by mass or less, most preferably 50% by mass or less. When the amount is within the range indicated above, the advantageous effect tends to be better achieved.

As described above, plasticizers containing a group that changes hydrophilicity with changes in temperature refer to, for example, plasticizers containing a group formed of a temperature-responsive polymer.

Specifically, plasticizers containing a group that changes hydrophilicity with changes in temperature may refer to oils, ester plasticizers, or liquid or solid resins (hereafter, also collectively referred to as "oils or the like") which contain a group formed of a temperature-responsive polymer. Such plasticizers may be used alone or in combinations of two or more.

In general, the conventional oils or the like do not contain a group formed of a temperature-responsive polymer.

Thus, although the specified plasticizers may be commercial products, if any, they may be produced by known synthesis techniques. For example, the plasticizers may be produced with reference to JP 2005-314419 A, JP 2016-505679 T, JP 2015-531672 T, JP 2003-252936 A, JP 2004-307523 A, etc.

In exemplary methods for producing the plasticizers, temperature-responsive polymers may be grafted to oils or the like by known techniques. Thus, plasticizers grafted with temperature-responsive polymers can be produced. For example, to produce plasticizers grafted with PNIPAM, isopropyl acrylamide (NIPAM), which is a monomer constituting PNIPAM, may be graft-polymerized with oils or the like.

Alternatively, a functional group may be added to the terminal of PNIPAM, and the terminally functionalized PNIPAM may be reacted with oils or the like to produce temperature-responsive polymer-grafted plasticizers.

In other exemplary methods for producing the plasticizers, the plasticizers may be synthesized from monomer components that can form temperature-responsive polymer units by known techniques. Thus, plasticizers containing temperature-responsive polymer units in the backbone can be produced.

For example, to produce plasticizers containing PNIPAM units in the backbone, oils or the like (in particular, liquid or solid resins) may be polymerized using as a monomer component isopropyl acrylamide (NIPAM), which is a monomer constituting PNIPAM. More specifically, liquid resins (liquid styrene-butadiene-NIPAM polymers) containing PNIPAM units in the backbone may be produced by polymerizing styrene and 1,3-butadiene as well as NIPAM as a monomer component.

Moreover, random copolymers or block copolymers may be produced by appropriately controlling the polymerization method. Using such techniques, plasticizers containing temperature-responsive polymer blocks in the backbone can also be produced.

The terminal of the temperature-responsive polymers (e.g., the groups of formulas (I) to (IV)) will be described.

In the case of the temperature-responsive polymer-grafted plasticizers, one terminal of the temperature-responsive polymers forms the backbone or a bond to the backbone while another terminal is typically a hydrogen atom, but in some cases may be attached to a polymerization initiator such as azobisisobutyronitrile (AIBN).

In the case of the plasticizers containing temperature-responsive polymer units in the backbone or the plasticizers containing temperature-responsive polymer blocks in the backbone, the terminal of the temperature-responsive polymers forms another structural unit or a bond to another structural unit. If the temperature-responsive polymer unit (temperature-responsive polymer block) is present at the molecular terminal, one terminal is typically a hydrogen atom, but in some cases may be attached to a polymerization initiator such as azobisisobutyronitrile (AIBN).

The following describes oils, ester plasticizers, or liquid or solid resins (also collectively referred to as "oils or the like") into which the group that changes hydrophilicity with changes in temperature (the group formed of a temperature-responsive polymer) is to be introduced. These may be used alone or in combinations of two or more. The oils or the like into which the specified group is to be introduced are not limited as long as they have plasticity. Examples include those commonly used as compounding ingredients for tires. As the oils or the like into which the specified group is to be introduced, oils and liquid or solid resins are preferred, liquid or solid resins are more preferred, and solid resins are still more preferred.

Non-limiting examples of the oils include conventional oils, including: process oils such as paraffinic process oils, aromatic process oils, and naphthenic process oils; low PCA (polycyclic aromatic) process oils such as TDAE and MES; vegetable oils; and mixtures of the foregoing. These oils may be used alone or in combinations of two or more. Preferred among these are aromatic process oils. Specific examples of the aromatic process oils include Diana Process Oil AH series produced by Idemitsu Kosan Co., Ltd.

The oils may be commercially available from Idemitsu Kosan Co., Ltd., Sankyo Yuka Kogyo K.K., Japan Energy Corporation, Olisoy, H & R, Hokoku Corporation, Showa Shell Sekiyu K.K., Fuji Kosan Co., Ltd., etc.

Examples of the ester plasticizers include the vegetable oils mentioned above; synthetic plasticizers and processed vegetable oils, such as glycerol fatty acid monoesters, glycerol fatty acid diesters, and glycerol fatty acid triesters; and phosphoric acid esters (e.g., phosphate plasticizers, and mixtures thereof). These ester plasticizers may be used alone or in combinations of two or more.

Suitable examples of the ester plasticizers include fatty acid esters represented by the following formula:

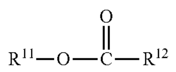

wherein $R^{11}$ represents a C1-C8 linear or branched alkyl group, a C1-C8 linear or branched alkenyl group, or a C2-C6 linear or branched alkyl group substituted with 1 to 5 hydroxy groups; and $R^{12}$ represents a C11-C21 alkyl or alkenyl group.

Examples of $R^{11}$ include methyl, ethyl, 2-ethylhexyl, isopropyl, and octyl groups, and groups obtained by substituting these groups with 1 to 5 hydroxy groups. Examples of $R^{12}$ include linear or branched alkyl or alkenyl groups such as lauryl, myristyl, palmityl, stearyl, and oleyl groups.

Examples of the fatty acid esters include alkyl oleates, alkyl stearates, alkyl linoleates, and alkyl palmitates. Preferred among these are alkyl oleates (e.g., methyl oleate, ethyl oleate, 2-ethylhexyl oleate, isopropyl oleate, octyl oleate). In such cases, the amount of the alkyl oleates based on 100% by mass of the fatty acid esters is preferably 80% by mass or more.

Other examples of the fatty acid esters include fatty acid monoesters or diesters formed from fatty acids (e.g., oleic acid, stearic acid, linoleic acid, palmitic acid) and alcohols (e.g., ethylene glycol, glycerol, trimethylolpropane, pentaerythritol, erythritol, xylitol, sorbitol, dulcitol, mannitol, inositol). Preferred among these are oleic acid monoesters. In such cases, the amount of the oleic acid monoesters based on 100% by mass of the combined amount of the fatty acid monoesters and fatty acid diesters is preferably 80% by mass or more.

Suitable ester plasticizers may include phosphoric acid esters.

Preferred phosphoric acid esters include C12-C30 compounds. Among these, C12-C30 trialkyl phosphates are suitable. The number of carbon atoms of the trialkyl phosphates means the total number of carbon atoms in the three alkyl groups. The three alkyl groups may be the same or different groups. Examples of the alkyl groups include linear or branched alkyl groups which may contain a hetero atom such as an oxygen atom or may be substituted with a halogen atom such as fluorine, chlorine, bromine, or iodine.

Other examples of the phosphoric acid esters include known phosphoric acid ester plasticizers such as: mono-, di-, or triesters of phosphoric acid with C1-C12 monoalcohols or their (poly)oxyalkylene adducts; and compounds obtained by substituting one or two alkyl groups of the trialkyl phosphonates with phenyl group(s). Specific examples include tris(2-ethylhexyl)phosphate, trimethyl phosphate, triethyl phosphate, tributyl phosphate, trioctyl phosphate, triphenyl phosphate, tricresyl phosphate, trixylenyl phosphate, cresyl diphenyl phosphate, 2-ethylhexyl diphenyl phosphate, and tris(2-butoxyethyl)phosphate.

Examples of the solid resins include resins that are solid at 25° C. such as terpene resins (including rosin resins), styrene resins, C5 resins, C9 resins, C5/C9 resins, coumarone indene resins (including resins based on coumarone or indene alone), olefin resins, urethane resins, acrylic resins, p-t-butylphenol acetylene resins, and dicyclopentadiene resins (DCPD resins). These resins may be hydrogenated. These may be used alone or in admixtures of two or more. Moreover, the resins themselves may be copolymers of monomer components of different origins. Preferred among these are styrene resins.

The solid resins may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., etc.

The softening point of the solid resins is preferably 30° C. or higher, more preferably 60° C. or higher, still more preferably 80° C. or higher, but is preferably 200° C. or lower, more preferably 160° C. or lower, still more preferably 140° C. or lower, particularly preferably 120° C. or lower. When the softening point is within the range indicated above, the advantageous effect tends to be more suitably achieved.

The softening point of the resins herein is determined as set forth in JIS K 6220-1:2001 using a ring and ball softening point measuring apparatus and defined as the temperature at which the ball drops down.

The terpene resins may be any resin that contains a unit derived from a terpene compound, and examples include polyterpenes (resins produced by polymerization of terpene compounds), terpene aromatic resins (resins produced by copolymerization of terpene compounds and aromatic compounds), and aromatic modified terpene resins (resins obtained by modification of terpene resins with aromatic compounds).

The terpene compounds refer to hydrocarbons having a composition represented by $(C_5H_8)_n$ or oxygen-containing derivatives thereof, each of which has a terpene backbone and is classified as, for example, a monoterpene ($C_{10}H_{16}$) sesquiterpene ($C_{15}H_{24}$), or diterpene ($C_{20}H_{32}$). Examples of the terpene compounds include α-pinene, β-pinene, dipentene, limonene, myrcene, allocimene, ocimene, α-phellandrene, α-terpinene, γ-terpinene, terpinolene, 1,8-cineole, 1,4-cineole, α-terpineol, β-terpineol, and γ-terpineol. Other examples of the terpene compounds include resin acids (rosin acids) such as abietic acid, neoabietic acid, palustric acid, levopimaric acid, pimaric acid, and isopimaric acid. In other words, the terpene resins include rosin resins formed mainly of rosin acids produced by processing pine resin. Examples of the rosin resins include natural rosin resins (polymerized rosins) such as gum rosins, wood rosins, and tall oil rosins; modified rosin resins such as maleic acid-modified rosin resins and rosin-modified phenol resins; rosin esters such as rosin glycerol esters; and disproportionated rosin resins obtained by disproportionation of rosin resins.

The aromatic compounds may be any compound having an aromatic ring. Examples include phenol compounds such as phenol, alkylphenols, alkoxyphenols, and unsaturated hydrocarbon group-containing phenols; naphthol compounds such as naphthol, alkylnaphthols, alkoxynaphthols, and unsaturated hydrocarbon group-containing naphthols; and styrene and styrene derivatives such as alkylstyrenes, alkoxystyrenes, and unsaturated hydrocarbon group-containing styrenes. Among these, styrene is preferred.

The styrene resins refer to polymers formed from styrene monomers as structural monomers, and examples include polymers polymerized from styrene monomers as main components (50% by mass or higher, preferably 80% by mass or higher). Specific examples include homopolymers polymerized from single styrene monomers (e.g., styrene, o-methylstyrene, m-methylstyrene, p-methylstyrene, α-methylstyrene, p-methoxystyrene, p-tert-butylstyrene, p-phenylstyrene, o-chlorostyrene, m-chlorostyrene, p-chlorostyrene), copolymers copolymerized from two or more styrene monomers, and copolymers of styrene monomers with additional monomers copolymerizable therewith. Preferred among these are copolymers of styrene monomers with additional monomers copolymerizable therewith.

Examples of the additional monomers include acrylonitriles such as acrylonitrile and methacrylonitrile; unsaturated carboxylic acids such as acrylic and methacrylic acid; unsaturated carboxylic acid esters such as methyl acrylate and methyl methacrylate; dienes such as chloroprene, butadiene, and isoprene; olefins such as 1-butene and 1-pentene; and α,β-unsaturated carboxylic acids and acid anhydrides thereof such as maleic anhydride. Preferred among these are unsaturated carboxylic acids, with acrylic and methacrylic acid being more preferred.

In particular, α-methylstyrene resins (e.g., α-methylstyrene homopolymers, copolymers of α-methylstyrene and styrene) are preferred, with copolymers of α-methylstyrene and styrene being more preferred.

Also preferred are styrene acrylic resins containing a (meth)acrylic component and a component derived from styrene as structural elements.

The liquid resins may be resins having a similar structure to that of the solid resins and also having a low softening point. Examples include resins that are liquid at 25° C. such as terpene resins (including rosin resins), styrene resins, C5 resins, C9 resins, C5/C9 resins, coumarone indene resins (including resins based on coumarone or indene alone), olefin resins, urethane resins, acrylic resins, p-t-butylphenol acetylene resins, and dicyclopentadiene resins (DCPD resins). These resins may be hydrogenated. These may be used alone or in admixtures of two or more. Moreover, the resins themselves may be copolymers of monomer components of different origins.

Further examples of other liquid resins include liquid (meaning liquid at 25° C., hereinafter the same) farnesene polymers such as liquid farnesene homopolymers, liquid farnesene-styrene copolymers, liquid farnesene-butadiene copolymers, liquid farnesene-styrene-butadiene copolymers, liquid farnesene-isoprene copolymers, and liquid farnesene-styrene-isoprene copolymers; liquid myrcene polymers such as liquid myrcene homopolymers, liquid myrcene-styrene copolymers, liquid myrcene-butadiene copolymers, liquid myrcene-styrene-butadiene copolymers, liquid myrcene-isoprene copolymers, and liquid myrcene-styrene-isoprene copolymers; liquid diene polymers such as liquid styrene butadiene copolymers (liquid SBR), liquid polybutadiene polymers (liquid BR), liquid polyisoprene polymers (liquid IR), liquid styrene-isoprene copolymers (liquid SIR), liquid styrene-butadiene-styrene block copolymers (liquid SBS block polymers), and liquid styrene-isoprene-styrene block copolymers (liquid SIS block polymers); liquid olefin polymers containing an olefin resin (e.g., polyethylene, polypropylene) as a hard segment (hard phase) and a rubber component as a soft segment (soft phase); and liquid ester polymers containing a polyester as a hard segment and a polyether, polyester, or the like as a soft segment. These may be modified at the chain end or backbone by a polar group. These may be used alone or in combinations of two or more. Among these, liquid diene polymers are preferred, with liquid BR being more preferred. Moreover, liquid resins modified with maleic acid are also preferred.

The liquid resins may be commercially available from Maruzen Petrochemical Co., Ltd., Sumitomo Bakelite Co., Ltd., Yasuhara Chemical Co., Ltd., Tosoh Corporation, Rutgers Chemicals, BASF, Arizona Chemical, Nitto Chemical Co., Ltd., Nippon Shokubai Co., Ltd., JXTG Nippon Oil & Energy Corporation, Arakawa Chemical Industries, Ltd., Taoka Chemical Co., Ltd., Sartomer, Kuraray Co., Ltd., etc.

The plasticizers containing a group that changes hydrophilicity with changes in temperature are preferably plasticizers containing a group that shows a lower critical solution temperature in water, more preferably plasticizers containing a poly(N-substituted (meth)acrylamide), still more preferably plasticizers containing a group of formula (I), particularly preferably plasticizers containing poly(N-isopropylacrylamide).

Moreover, the plasticizers are preferably liquid or solid resins into which any of these groups has been introduced. The plasticizers are more preferably styrene resins, still more preferably copolymers of styrene monomers with additional monomers copolymerizable therewith, particularly preferably styrene acrylic resins, into each of which any of the groups has been introduced. Moreover, the plasticizers are more preferably liquid diene polymers, still more preferably liquid BR, into each of which any of the groups has been introduced.

The plasticizers containing a group that changes hydrophilicity with changes in temperature are intended for use in resins and/or elastomers.

The resins to which the plasticizers may be applied are not limited. Examples include, in addition to the above-mentioned resins: thermoplastic resins such as polycarbonate resins, polyester resins, polyester carbonate resins, polyphenylene ether resins, polyphenylene sulfide resins, polysulfone resins, polyether sulfone resins, polyarylene resins, polyamide resins, polyether imide resins, polyacetal resins, polyvinyl acetal resins, polyketone resins, polyether ketone resins, polyether ether ketone resins, polyaryl ketone resins, polyether nitrile resins, liquid crystal resins, polybenzimidazole resins, polyparabanic acid resins, polyolefin resins, vinyl chloride resins, and cellulose resins; and thermosetting resins such as epoxy resins, polyamide imide resins, thermosetting polyester resins (unsaturated polyester resins), silicone resins, urethane resins, (meth)acrylic resins, fluorine resins, phenol resins, urea resins, melamine resins, polyimide resins, alkyd resins, polyvinyl ester resins, polydialkyl phthalate resins, bismaleimide-triazine resins, furan resins, xylene resins, guanamine resins, maleic resins, and polyether resins. These resins may be used alone or in combinations of two or more.

The elastomers to which the plasticizers may be applied are not limited. Examples include diene rubbers commonly used as rubber components in compositions for tires, such as isoprene-based rubbers, polybutadiene rubber (BR), styrene-butadiene rubber (SBR), styrene-isoprene-butadiene rubber (SIBR), ethylene-propylene-diene rubber (EPDM), chloroprene rubber (CR), and acrylonitrile butadiene rubber (NBR); acrylic rubbers such as butyl acrylate rubber, ethyl acrylate rubber, and octyl acrylate rubber; nitrile rubber, isobutylene rubber, methyl methacrylate-butyl acrylate block copolymers, ethylene-propylene copolymers (EPR), chlorosulfonated polyethylene, silicone rubber (millable type, room temperature vulcanizing type), butyl rubber, fluororubber, olefin-based thermoplastic elastomers, styrene-based thermoplastic elastomers, vinyl chloride-based thermoplastic elastomers, urethane-based thermoplastic elastomers, polyamide-based thermoplastic elastomers, polyester-based thermoplastic elastomers, fluorine-based thermoplastic elastomers, styrene-isobutylene-styrene block copolymers (SIBS), styrene-isoprene-styrene block copolymers (SIS), styrene-isobutylene block copolymers (SIB), styrene-butadiene-styrene block copolymers (SBS), styrene-ethylene/butene-styrene block copolymers (SEBS), styrene-ethylene/propylene-styrene block copolymers (SEPS), styrene-ethylene/ethylene/propylene-styrene block copolymers (SEEPS), and styrene-butadiene/butylene-styrene block copolymers (SBBS). These elastomers may be used alone or in combinations of two or more.

Among the resins and elastomers to which the plasticizers may be applied, rubbers are preferred, diene rubbers are more preferred, and isoprene-based rubbers, BR, and SBR are still more preferred.

(Composition)

Next, compositions containing any of the specified plasticizers (plasticizers containing a group that changes hydrophilicity with changes in temperature) will be described.

In the compositions, the amount of the specified plasticizers per 100 parts by mass of the polymer component (preferably 100 parts by mass of the rubber component) used is preferably 0.1 parts by mass or more, more preferably 1 part by mass or more, still more preferably 3 parts by mass or more, particularly preferably 5 parts by mass or more, most preferably 10 parts by mass or more, but is preferably 200 parts by mass or less, more preferably 100 parts by mass or less, still more preferably 80 parts by mass or less, particularly preferably 60 parts by mass or less, most preferably 50 parts by mass or less. When the amount is within the range indicated above, the advantageous effect tends to be better achieved.

The specified plasticizers may be used together with plasticizers other than the specified plasticizers. Examples of such plasticizers other than the specified plasticizers include the above-mentioned oils or the like into which the specified group is to be introduced. These may be used alone or in combinations of two or more.

The total plasticizer amount (the combined amount of the specified plasticizers and the plasticizers other than the specified plasticizers) is as described for the amount of the specified plasticizers.

The amount of the plasticizers includes the amount of the plasticizers contained in the rubbers (oil extended rubbers) or sulfur (oil-containing sulfur), if used.

The polymer component used in the compositions may include any of the above-mentioned resins and elastomers to which the plasticizers may be applied. They may be used alone or in combinations of two or more. Among them, rubbers are preferred, diene rubbers are more preferred, and isoprene-based rubbers, BR, and SBR are still more preferred.

The polymer component (preferably the rubber component) preferably includes a polymer (rubber) having a weight average molecular weight (Mw) of 200,000 or more, more preferably 350,000 or more. The upper limit of the Mw is not limited, but is preferably 4,000,000 or less, more preferably 3,000,000 or less.

The Mw and the number average molecular weight (Mn) herein can be determined by gel permeation chromatography (GPC) (GPC-8000 series available from Tosoh Corporation, detector: differential refractometer, column: TSKGEL SUPERMULTIPORE HZ-M available from Tosoh Corporation) calibrated with polystyrene standards.

The diene rubber content based on 100% by mass of the polymer component (preferably 100% by mass of the rubber component) is preferably 20% by mass or higher, more preferably 50% by mass or higher, still more preferably 70% by mass or higher, particularly preferably 80% by mass or higher, most preferably 90% by mass or higher, and may be 100% by mass. When the diene rubber content is within the range indicated above, the advantageous effect tends to be better achieved.

The polymer component may include either an unmodified or modified polymer.

The modified polymer may be any polymer (preferably diene rubber) having a functional group interactive with a filler such as silica. For example, it may be a chain end-modified polymer obtained by modifying at least one chain end of a polymer by a compound (modifier) having the functional group (i.e., a chain end-modified polymer terminated with the functional group); a backbone-modified polymer having the functional group in the backbone; a backbone- and chain end-modified polymer having the functional group in both the backbone and chain end (e.g., a backbone- and chain end-modified polymer in which the backbone has the functional group and at least one chain end is modified by the modifier); or a chain end-modified polymer which has been modified (coupled) with a polyfunctional compound having two or more epoxy groups in the molecule so that a hydroxy or epoxy group is introduced.

Examples of the functional group include amino, amide, silyl, alkoxysilyl, isocyanate, imino, imidazole, urea, ether, carbonyl, oxycarbonyl, mercapto, sulfide, disulfide, sulfonyl, sulfinyl, thiocarbonyl, ammonium, imide, hydrazo, azo, diazo, carboxyl, nitrile, pyridyl, alkoxy, hydroxy, oxy, and epoxy groups. These functional groups may be substituted. Preferred among these are amino groups (preferably amino groups whose hydrogen atom is replaced with a C1-C6 alkyl group), alkoxy groups (preferably C1-C6 alkoxy groups), and alkoxysilyl groups (preferably C1-C6 alkoxysilyl groups).

Any SBR may be used. Examples include emulsion-polymerized styrene-butadiene rubber (E-SBR) and solution-polymerized styrene-butadiene rubber (S-SBR). These may be used alone or in combinations of two or more.

The SBR preferably has a styrene content of 5% by mass or higher, more preferably 10% by mass or higher, still more preferably 15% by mass or higher, particularly preferably 20% by mass or higher, most preferably 25% by mass or higher, further most preferably 30% by mass or higher, still further most preferably 35% by mass or higher. The styrene content is also preferably 60% by mass or lower, more preferably 50% by mass or lower, still more preferably 45% by mass or lower. When the styrene content is within the range indicated above, the advantageous effect tends to be better achieved.

The styrene content of the SBR herein can be calculated by $^{1}$H-NMR analysis.

SBR products manufactured or sold by Sumitomo Chemical Co., Ltd., JSR Corporation, Asahi Kasei Corporation, Zeon Corporation, etc. may be used as the SBR.

The SBR may be either unmodified or modified SBR. Examples of the modified SBR include those into which functional groups as listed for the modified polymer are introduced. Preferred among these is modified SBR.

Any BR may be used. Examples include high-cis BR having a high cis content, SBR containing syndiotactic polybutadiene crystals, and BR synthesized using rare earth catalysts (rare earth-catalyzed BR). These may be used alone or in combinations of two or more. In particular, high-cis BR having a cis content of 90% by mass or higher is preferred because it improves abrasion resistance. The cis content can be measured by infrared absorption spectrometry.

The BR may be either unmodified or modified BR. Examples of the modified BR include those into which functional groups as listed for the modified polymer are introduced.

The BR may be commercially available from Ube Industries, Ltd., JSR Corporation, Asahi Kasei Corporation, Zeon Corporation, etc.

Examples of isoprene-based rubbers include natural rubber (NR), polyisoprene rubber (IR), refined NR, modified NR, and modified IR. The NR may be one commonly used in the tire industry such as SIR20, RSS #3, or TSR20. Non-limiting examples of the IR include those commonly used in the tire industry such as IR2200. Examples of the refined NR include deproteinized natural rubber (DPNR) and highly purified natural rubber (UPNR). Examples of the modified NR include epoxidized natural rubber (ENR), hydrogenated natural rubber (HNR), and grafted natural rubber. Examples of the modified IR include epoxidized polyisoprene rubber, hydrogenated polyisoprene rubber, and grafted polyisoprene rubber. These may be used alone or in combinations of two or more. Among these, NR is preferred.

The SBR content based on 100% by mass of the polymer component (preferably 100% by mass of the rubber component) is preferably 1% by mass or higher, more preferably 10% by mass or higher, still more preferably 50% by mass or higher, particularly preferably 70% by mass or higher. The SBR content may be 100% by mass, but is preferably 90% by mass or lower, more preferably 80% by mass or lower. When the SBR content is within the range indicated above, the advantageous effect tends to be better achieved.

The BR content based on 100% by mass of the polymer component (preferably 100% by mass of the rubber component) is preferably 1% by mass or higher, more preferably 5% by mass or higher, still more preferably 10% by mass or higher, particularly preferably 15% by mass or higher. The BR content may be 100% by mass, but is preferably 80% by mass or lower, more preferably 50% by mass or lower. When the BR content is within the range indicated above, the advantageous effect tends to be better achieved.

The isoprene-based rubber content based on 100% by mass of the polymer component (preferably 100% by mass of the rubber component) is preferably 1% by mass or higher, more preferably 2% by mass or higher, still more preferably 3% by mass or higher, particularly preferably 4% by mass or higher, most preferably 10% by mass or higher. The isoprene-based rubber content may be 100% by mass, but is preferably 80% by mass or lower, more preferably 50% by mass or lower. When the isoprene-based rubber content is within the range indicated above, the advantageous effect tends to be better achieved.

The compositions preferably contain silica as a filler (reinforcing filler).

Any silica may be used, and examples include dry silica (anhydrous silicic acid) and wet silica (hydrous silicic acid). These may be used alone or in combinations of two or more. Among these, wet silica is preferred because it has a large number of silanol groups.

The silica may be commercially available from Degussa, Rhodia, Tosoh Silica Corporation, Solvay Japan, Tokuyama Corporation, etc.

The silica preferably has a nitrogen adsorption specific surface area ($N_2SA$) of 50 $m^2/g$ or more, more preferably 150 $m^2/g$ or more, still more preferably 200 $m^2/g$ or more. The $N_2SA$ is also preferably 300 $m^2/g$ or less, more preferably 250 $m^2/g$ or less. When the $N_2SA$ is within the range indicated above, the advantageous effect tends to be better achieved.

The $N_2SA$ of the silica can be measured in accordance with ASTM D3037-81.

The amount of the silica per 100 parts by mass of the polymer component (preferably 100 parts by mass of the rubber component) is preferably 0.1 parts by mass or more, more preferably 10 parts by mass or more, still more preferably 30 parts by mass or more, particularly preferably 50 parts by mass or more, but is preferably 200 parts by mass or less, more preferably 180 parts by mass or less, still more preferably 150 parts by mass or less, particularly preferably 120 parts by mass or less. When the amount is within the range indicated above, the advantageous effect tends to be better achieved.

When the compositions contain silica, they preferably contain a silane coupling agent together with the silica.

Non-limiting examples of the silane coupling agent include sulfide silane coupling agents such as bis(3-triethoxysilylpropyl) tetrasulfide, bis(2-triethoxysilylethyl)tetrasulfide, bis(4-triethoxysilylbutyl)tetrasulfide, bis(3-trimethoxysilylpropyl)tetrasulfide, bis(2-trimethoxysilylethyl) tetrasulfide, bis(2-triethoxysilylethyl)trisulfide, bis(4-trimethoxysilylbutyl)trisulfide, bis(3-triethoxysilylpropyl) disulfide, bis(2-triethoxysilylethyl)disulfide, bis(4-triethoxysilylbutyl) disulfide, bis(3-trimethoxysilylpropyl) disulfide, bis(2-trimethoxysilylethyl)disulfide, bis(4-trimethoxysilylbutyl)disulfide, 3-trimethoxysilylpropyl-N,N-dimethylthiocarbamoyl tetrasulfide, 2-triethoxysilylethyl-N,N-dimethylthiocarbamoyl tetrasulfide, and 3-triethoxysilylpropyl methacrylate monosulfide; mercapto silane coupling agents such as 3-mercaptopropyltrimethoxysilane, 2-mercaptoethyltriethoxysilane, and NXT and NXT-Z both available from Momentive; vinyl silane coupling agents such as vinyltriethoxysilane and vinyltrimethoxysilane; amino silane coupling agents such as 3-aminopropyltriethoxysilane and 3-aminopropyltrimethoxysilane; glycidoxy silane coupling agents such as γ-glycidoxypropyltriethoxysilane and γ-glycidoxypropyltrimethoxysilane; nitro silane coupling agents such as 3-nitropropyltrimethoxysilane and 3-nitropropyltriethoxysilane; and chloro silane coupling agents such as 3-chloropropyltrimethoxysilane and 3-chloropropyltriethoxysilane. These may be used alone or in combinations of two or more.

The silane coupling agent may be commercially available from Degussa, Momentive, Shin-Etsu Silicone, Tokyo Chemical Industry Co., Ltd., AZmax. Co., Dow Corning Toray Co., Ltd., etc.

The amount of the silane coupling agent, if present, per 100 parts by mass of the silica is preferably 0.1 parts by mass or more, more preferably 2 parts by mass or more, still more preferably 3 parts by mass or more. The amount is also preferably 20 parts by mass or less, more preferably 16 parts by mass or less, still more preferably 12 parts by mass or less. When the amount is within the range indicated above, the advantageous effect tends to be better achieved.

The compositions preferably contain carbon black.

Examples of the carbon black include N134, N110, N220, N234, N219, N339, N330, N326, N351, N550, and N762. These may be used alone or in combinations of two or more.

The carbon black preferably has a nitrogen adsorption specific surface area ($N_2SA$) of 5 $m^2/g$ or more, more preferably 30 $m^2/g$ or more, still more preferably 60 $m^2/g$ or more. The $N_2SA$ is also preferably 300 $m^2/g$ or less, more preferably 200 $m^2/g$ or less, still more preferably 150 $m^2/g$ or less, particularly preferably 100 $m^2/g$ or less. When the $N_2SA$ is within the range indicated above, the advantageous effect tends to be better achieved.

The nitrogen adsorption specific surface area of the carbon black is determined in accordance with JIS K6217-2:2001.

The carbon black preferably has a dibutyl phthalate oil absorption (DBP) of 5 ml/100 g or more, more preferably 70 ml/100 g or more, still more preferably 90 ml/100 g or more. The DBP is also preferably 300 ml/100 g or less, more preferably 200 ml/100 g or less, still more preferably 160 ml/100 g or less, particularly preferably 120 ml/100 g or less. When the DBP is within the range indicated above, the advantageous effect tends to be better achieved.

The DBP of the carbon black can be measured in accordance with JIS-K6217-4:2001.

The carbon black may be commercially available from Asahi Carbon Co., Ltd., Cabot Japan K.K., Tokai Carbon Co., Ltd., Mitsubishi Chemical Corporation, Lion Corporation, NSCC Carbon Co., Ltd., Columbia Carbon, etc.

The amount of the carbon black per 100 parts by mass of the polymer component (preferably 100 parts by mass of the rubber component) is preferably 0.1 parts by mass or more, more preferably 1 part by mass or more, still more preferably 3 parts by mass or more, particularly preferably 5 parts by mass or more, but is preferably 200 parts by mass or less, more preferably 150 parts by mass or less, still more preferably 120 parts by mass or less, particularly preferably 80 parts by mass or less. When the amount is within the range indicated above, the advantageous effect tends to be better achieved.

The compositions preferably contain sulfur.

Examples of the sulfur include those commonly used in the rubber industry, such as powdered sulfur, precipitated sulfur, colloidal sulfur, insoluble sulfur, highly dispersible sulfur, and soluble sulfur. These may be used alone or in combinations of two or more.

The sulfur may be commercially available from Tsurumi Chemical Industry Co., Ltd., Karuizawa Sulfur Co., Ltd., Shikoku Chemicals Corporation, Flexsys, Nippon Kanryu Industry Co., Ltd., Hosoi Chemical Industry Co., Ltd., etc.

The amount of the sulfur per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The compositions preferably contain a vulcanization accelerator.

Examples of the vulcanization accelerator include thiazole vulcanization accelerators such as 2-mercaptobenzothiazole and di-2-benzothiazolyl disulfide; thiuram vulcanization accelerators such as tetramethylthiuram disulfide (TMTD), tetrabenzylthiuram disulfide (TBzTD), and tetrakis(2-ethylhexyl)thiuram disulfide (TOT-N); sulfenamide vulcanization accelerators such as N-cyclohexyl-2-benzothiazolylsulfenamide, N-t-butyl-2-benzothiazolylsulfenamide, N-oxyethylene-2-benzothiazole sulfenamide, and N,N'-diisopropyl-2-benzothiazole sulfenamide; and guanidine vulcanization accelerators such as diphenylguanidine, diorthotolylguanidine, and orthotolylbiguanidine. These may be used alone or in combinations of two or more.

The vulcanization accelerator may be commercially available from Kawaguchi Chemical Industry Co., Ltd., Ouchi Shinko Chemical Industrial Co., Ltd., Rhein Chemie, etc.

The amount of the vulcanization accelerator per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The compositions preferably contain stearic acid.

The stearic acid may be a conventional one, e.g., available from NOF Corporation, Kao Corporation, Fujifilm Wako Pure Chemical Corporation, or Chiba Fatty Acid Co., Ltd.

The amount of the stearic acid per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The compositions may contain zinc oxide.

The zinc oxide may be a conventional one, e.g., available from Mitsui Mining & Smelting Co., Ltd., Toho Zinc Co., Ltd., HakusuiTech Co., Ltd., Seido Chemical Industry Co., Ltd., or Sakai Chemical Industry Co., Ltd.

The amount of the zinc oxide per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The compositions may contain an antioxidant.

Examples of the antioxidant include naphthylamine antioxidants such as phenyl-α-naphthylamine; diphenylamine antioxidants such as octylated diphenylamine and 4,4'-bis(α,α'-dimethylbenzyl)diphenylamine; p-phenylenediamine antioxidants such as N-isopropyl-N'-phenyl-p-phenylenediamine, N-(1,3-dimethylbutyl)-W-phenyl-p-phenylenediamine, and N,N'-di-2-naphthyl-p-phenylenediamine; quinoline antioxidants such as 2,2,4-trimethyl-1,2-dihydroquinoline polymer; monophenolic antioxidants such as 2,6-di-t-butyl-4-methylphenol and styrenated phenol; and bis-, tris-, or polyphenolic antioxidants such as tetrakis[methylene-3-(3',5'-di-t-butyl-4'-hydroxyphenyl)propionate]methane. These may be used alone or in combinations of two or more. Among these, p-phenylenediamine or quinoline antioxidants are preferred, and p-phenylenediamine antioxidants are more preferred.

The antioxidant may be commercially available from Seiko Chemical Co., Ltd., Sumitomo Chemical Co., Ltd., Ouchi Shinko Chemical Industrial Co., Ltd., Flexsys, etc.

The amount of the antioxidant per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

The compositions may contain a wax.

Non-limiting examples of the wax include petroleum waxes such as paraffin waxes and microcrystalline waxes; naturally-occurring waxes such as plant waxes and animal waxes; and synthetic waxes such as polymers of ethylene, propylene, or other similar monomers. These may be used alone or in combinations of two or more.

The wax may be commercially available from Ouchi Shinko Chemical Industrial Co., Ltd., Nippon Seiro Co., Ltd., Seiko Chemical Co., Ltd., etc.

The amount of the wax per 100 parts by mass of the polymer component (preferably 100 parts by mass of the rubber component) is preferably 0.1 parts by mass or more, more preferably 0.5 parts by mass or more, still more preferably 1 part by mass or more. The amount is also preferably 20 parts by mass or less, more preferably 10 parts by mass or less, still more preferably 8 parts by mass or less, particularly preferably 5 parts by mass or less. When the amount is within the range indicated above, the advantageous effect tends to be better achieved.

In addition to the above-mentioned components, the compositions may contain additives commonly used in the tire industry, such as vulcanizing agents other than sulfur (e.g., organic crosslinking agents, organic peroxides), calcium carbonate, mica such as sericite, aluminum hydroxide, magnesium oxide, magnesium hydroxide, clay, talc, alumina, and titanium oxide. The amount of each of these components per 100 parts by mass of the polymer component (preferably the rubber component) is preferably 0.1 parts by mass or more but preferably 200 parts by mass or less.

The compositions may be prepared, for example, by kneading the components using a rubber kneading machine such as an open roll mill or a Banbury mixer, and then vulcanizing the kneaded mixture.

The kneading conditions are as follows. In a base kneading step of kneading additives other than crosslinking agents (vulcanizing agents) and vulcanization accelerators, the kneading temperature is usually 100 to 180° C., preferably 120 to 170° C. In a final kneading step of kneading vulcanizing agents and vulcanization accelerators, the kneading temperature is usually 120° C. or lower, preferably 80 to 110° C. The composition obtained after kneading vulcanizing agents and vulcanization accelerators is usually vulcanized by, for example, press vulcanization. The vulcanization temperature is usually 140 to 190° C., preferably 150 to 185° C.

The compositions may be used (as rubber compositions for tires) in tire components, including, for example, treads (cap treads), sidewalls, base treads, undertreads, clinches, bead apexes, breaker cushion rubbers, rubbers for carcass cord topping, insulations, chafers, and innerliners, and side reinforcement layers of run-flat tires. Among these, the compositions are suitable for use in treads. When the compositions are used in treads, they may be used either only in cap treads or only in base treads, but are preferably used in both treads.

The tires of the present invention can be produced from the compositions by usual methods. Specifically, the unvulcanized compositions mixed with additives as needed may each be extruded into the shape of a tire component (in particular a tread (cap tread)) and then formed and assembled with other tire components in a usual manner in a tire building machine to build an unvulcanized tire, which may then be heated and pressurized in a vulcanizer to produce a tire.

Non-limiting examples of the tires include pneumatic tires, solid tires, and airless tires. Pneumatic tires are preferred among these.

The tires are suitable for use as tires for passenger vehicles, large passenger vehicles, large SUVs, trucks and buses, or two-wheeled vehicles, racing tires, winter tires (studless winter tires, snow tires, studded tires), all-season tires, run-flat tires, aircraft tires, mining tires, etc.

EXAMPLES

The present invention is specifically described with reference to, but not limited to, examples.

The chemicals used in the synthesis or polymerization were purified, if needed, by usual methods.

(Production Example 1) Synthesis of Material A (PNIPAM)

A nitrogen-purged glass flask was charged with 11.32 g of N-isopropylacrylamide (NIPAM monomer) and then with 25 mL of toluene, followed by stirring at room temperature for 30 minutes to obtain a homogeneous solution. Thereto was added 1.10 g of 2,2'-azobis(isobutyronitrile) (AIBN), and the mixture was reacted under reflux for three hours. The reaction solution was subjected to thin-layer chromatography (carrier: silica gel) to confirm the disappearance of a spot of the starting material NIPAM monomer (Rf=0.8) and the appearance of a new spot of a NIPAM polymer (PNIPAM). The toluene solvent in the reaction solution was removed using a rotary evaporator, and the remaining white powder was dried under reduced pressure at a degree of pressure reduction of 0.1 Pa or less at 80° C. for eight hours to obtain PNIPAM at a yield of 95%.

The obtained PNIPAM was dissolved in water to prepare a 1% by mass aqueous solution. Then, the appearance of the PNIPAM aqueous solution was monitored while heating from 20° C. to 40° C. The solution was found to be clear and colorless at 32° C. or lower but cloudy at 32° C. or higher. The Mw was 2000.

(Production Example 2) Synthesis of Material B (PNIPAM-PS Resin)

A nitrogen-purged glass flask was charged with 11.32 g of N-isopropylacrylamide (NIPAM monomer) and then with 25 mL of toluene, followed by stirring at room temperature for 30 minutes to obtain a homogeneous solution. Thereto was added 1.10 g of 2,2'-azobis(isobutyronitrile) (AIBN), and the mixture was reacted under reflux for three hours. The reaction solution was subjected to thin-layer chromatography to confirm the disappearance of a spot of the starting material NIPAM monomer (Rf=0.8) and the appearance of a new spot of a NIPAM polymer (PNIPAM). After the reaction solution was cooled to 40° C., 11.32 g of a styrene acrylic resin (PS) and 25 mL of toluene were added, and the mixture was reacted under reflux for three hours. The reaction solution was subjected to GPC analysis to confirm the disappearance of PS-derived peaks. Then, the toluene solvent in the reaction solution was removed using a rotary evaporator, and the remaining dry solid was dried under reduced pressure at a degree of pressure reduction of 0.1 Pa or less at 80° C. for eight hours to obtain a PNIPAM-PS resin at a yield of 95%. The Mw of the group (PNIPAM group) that changes hydrophilicity with changes in temperature was 2000.

The styrene acrylic resin used was ARUFON UH-2170 (softening point: 80° C.) available from Toagosei Co., Ltd.

(Production Example 3) Synthesis of Material C (PNIPAM-BR Plasticizer)

Material C was prepared at a yield of 93% as in Production Example 2, except that the styrene acrylic resin was changed to a maleic acid-modified liquid BR. The Mw of the group (PNIPAM group) that changes hydrophilicity with changes in temperature was 2000.

The maleic acid-modified liquid BR used was Ricon 130MA8 (maleic acid-modified liquid BR, Mw: 2700) available from Cray Valley.

The chemicals used in the examples and comparative examples below are listed below.

NR: TSR20 (natural rubber)

Carbon black: N134 ($N_2SA$: 148 $m^2/g$, DBP: 123 ml/100 g) available from Cabot Japan K.K.

Silica: ULTRASIL VN3 ($N_2SA$: 175 $m^2/g$) available from Evonik Degussa

Silane coupling agent: Si69 (bis(3-triethoxysilylpropyl) tetrasulfide) available from Evonik Degussa Antioxidant: NOCRAC 6C (N-(1,3-dimethylbutyl)-N'-phenyl-p-phenylenediamine) available from Ouchi Shinko Chemical Industrial Co., Ltd.

Stearic acid: stearic acid available from NOF Corporation

Zinc oxide: zinc oxide #1 available from Mitsui Mining & Smelting Co., Ltd.

Sulfur: sulfur powder available from Tsurumi Chemical Industry Co., Ltd.

Vulcanization accelerator (1): NOCCELER CZ (N-cyclohexyl-2-benzothiazolylsulfenamide) available from Ouchi Shinko Chemical Industrial Co., Ltd.

Vulcanization accelerator (2): NOCCELER D (1,3-diphenylguanidine) available from Ouchi Shinko Chemical Industrial Co., Ltd.

Oil: DIANA PROCESS AH-24 available from Idemitsu Kosan Co., Ltd.

Examples and Comparative Examples

An amount of 100 parts by mass of the NR, 5 parts by mass of the carbon black, 50 parts by mass of the silica, 4 parts by mass of the silane coupling agent, 3 parts by mass of the antioxidant, 3 parts by mass of the stearic acid, 3 parts by mass of the zinc oxide, and the plasticizer in the amount shown in Table 2 were kneaded using a 1.7 L Banbury mixer (Kobe Steel, Ltd.) at 150° C. for five minutes to give a kneaded mixture. Then, the kneaded mixture was kneaded with 3 parts by mass of the sulfur, 2 parts by mass of the vulcanization accelerator (1), and 1 part by mass of the vulcanization accelerator (2) in an open roll mill at 80° C. for five minutes to give an unvulcanized rubber composition.

The unvulcanized rubber composition was press-vulcanized at 170° C. for 15 minutes to give a vulcanized rubber composition sheet having a thickness of 2 mm.

The 2 mm-thick vulcanized rubber composition sheets prepared as above were used to measure the water contact angle of the rubber compositions. Table 2 shows the results.

(Measurement of Water Contact Angle)

The water contact angle of the 2 mm-thick vulcanized rubber composition sheets was measured.

Specifically, the 2 mm-thick vulcanized rubber composition sheets were kept at the measurement temperature for 10 minutes, and a water droplet of 20 μL was dropped on the surface of each sheet. Twenty seconds later, the contact angle of the water droplet was measured using a contact angle meter.

The measurements were first carried out at a measurement temperature of 30° C. and then at a measurement temperature of 40° C. The obtained results were taken as the first measurement results. After the first measurements, the measured vulcanized rubber composition sheets were immersed in water such that the measurement surface was in contact with water for one hour. After the immersion in water, the vulcanized rubber composition sheets were dried at 60° C. for 24 hours. Then, the dried vulcanized rubber composition sheets were cooled to room temperature, and the second measurements were carried out at a measurement temperature of 30° C. and then at a measurement temperature of 40° C. The obtained results were taken as the second measurement results. Table 2 shows the results.

TABLE 2

| | | Comparative Example | | | Example | | |
|---|---|---|---|---|---|---|---|
| | Plasticizer | 1 | 2 | 3 | 1 | 2 | 3 |
| Amount (parts by mass) | Styrene acrylic resin | | 20 | | | | |
| | Material B | | | | 20 | | 10 |
| | Oil | 20 | | | | | |
| | Maleic acid-modified liquid BR | | | 20 | | | |
| | Material C | | | | | 20 | 10 |
| Contact angle first measurements | 40° C. | 96 | 94 | 93 | 94 | 94 | 95 |
| | 30° C. | 96 | 93 | 93 | 89 | 88 | 88 |
| | Rate of change in contact angle | 100 | 99 | 100 | 95 | 94 | 93 |
| Contact angle second measurements | 40° C. | 99 | 94 | 93 | 95 | 97 | 95 |
| | 30° C. | 99 | 94 | 93 | 89 | 88 | 88 |
| | Rate of change in contact angle | 100 | 100 | 100 | 94 | 91 | 93 |

Table 2 shows that, while Comparative Examples 1 to 3 using a common plasticizer exhibited no change in hydrophilicity (contact angle) with changes in temperature, Examples 1 to 3 using a plasticizer for resins and/or elastomers containing a group that changes hydrophilicity with changes in temperature exhibited changes in hydrophilicity (contact angle) with changes in temperature, which may change the compatibility with other components in the compositions, so that the tire performance can be varied in response to temperature changes.

The invention claimed is:

1. A tire, comprising a tire component comprising a composition comprising:

a polymer component; and a plasticizer for at least one of resins or elastomers, the plasticizer comprising a group that changes hydrophilicity with changes in temperature, wherein the amount of the plasticizer is 10 to 50 parts by mass per 100 parts by mass of the polymer component, wherein the plasticizer is an oil, an ester plasticizer, or a liquid or solid resin, and a polymer that shows a lower critical solution temperature in water is introduced into the plasticizer such that the plasticizer is graft-bonded to the polymer that shows a lower critical solution temperature in water, and wherein the polymer component is a diene rubber.

2. The tire according to claim 1, wherein the tire component is a tread.

3. The tire according to claim 1, wherein the group shows a lower critical solution temperature in water.

4. The tire according to claim 1, wherein the group is represented by the following formula (I):

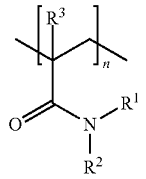

(I)

wherein n represents an integer of 1 to 1000; and $R^1$, $R^2$, and $R^3$ each independently represent a hydrogen atom or a hydrocarbyl group, provided that at least one of $R^1$ or $R^2$ is not a hydrogen atom, and $R^1$ and $R^2$ together may form a ring structure.

5. The tire according to claim 1, wherein the group is poly (N-isopropylacrylamide).

6. The tire according to claim 1, wherein the solid resin is at least one resin which is solid at 25° C. selected from the group consisting of terpene resins (including rosin resins), styrene resins, C5 resins, C9 resins, C5/C9 resins, coumarone indene resins (including resins based on coumarone or indene alone), olefin resins, urethane resins, acrylic resins, p-t-butylphenol acetylene resins, and dicyclopentadiene resins (DCPD resins), wherein the solid resin does not contain poly (N-isopropylacrylamide), wherein the liquid resin is at least one resin which is liquid at 25° C. selected from the group consisting of terpene resins (including rosin resins), styrene resins, C5 resins, C9 resins, C5/C9 resins, coumarone indene resins (including resins based on coumarone or indene alone), olefin resins, urethane resins, acrylic resins, p-t-butylphenol acetylene resins, and dicyclopentadiene resins (DCPD resins), and wherein the liquid resin does not contain poly (N-isopropylacrylamide).

* * * * *